Figure 1:
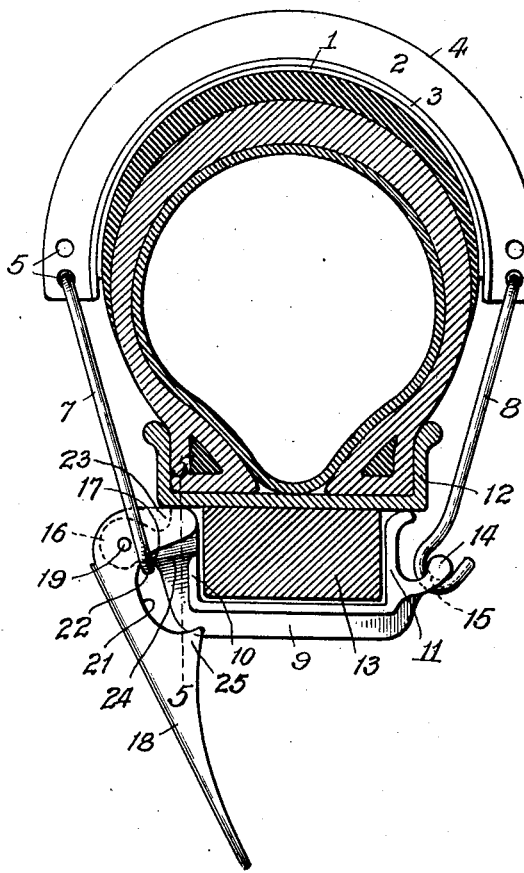

April 10, 1928. 1,665,478

S. G. SCHOLZ

TRACTION DEVICE

Filed Oct. 18, 1923

Inventor:
Samuel G. Scholz,
by Wallace R. Lane,
Atty.

Patented Apr. 10, 1928.

1,665,478

UNITED STATES PATENT OFFICE.

SAMUEL G. SCHOLZ, OF HUTCHINSON, KANSAS.

TRACTION DEVICE.

Application filed October 18, 1923. Serial No. 669,198.

The present invention relates to traction devices of the kind used on the wheels of vehicles in places where the smooth surface of the tire of a wheel would not be sufficient to obtain the necessary traction whereby the vehicle may be moved.

Among the objects of the invention are to provide a novel traction device in the nature of a clamp capable of being readily attached and detached to and from the tire of a wheel by the use of one hand, such that when being attached to the tire of an automobile wheel, the same may be connected or disconnected by the use of one hand only and while the person so connecting or disconnecting it may stand upon the running board or other parts of an automobile without necessitating the operator standing in the mud or other undesirable place for effecting the connecting or disconnecting of the device; to provide such device with a unitary and rigid shoe or traction member capable of being clamped to the outer surface or periphery of the tire of the wheel; to provide the same with a clamping means preferably having a lever formed with a cam acting against a connecting member, such as a link, so that upon the initial or first movement of the lever the cam will act to rapidly take up the slack in the clamping means, and then slowly and forcibly tightening the clamping means so that the traction member will not be displaced or slide upon the surface of the tire; to provide such device with means so that the stress of reaction, when the clamp is tightened, will not be effective against the wooden felly of the wheel but will be received by the metal rim, thus protecting the wooden felly and making the clamping device all the more efficient; to so construct the device that the reaction stress will not be ultimately received or felt upon the clamping lever but will be taken up or received by the link resting positively upon the clamping member and hence reacting directly upon the rim of the wheel; to provide the clamping member with means to receive the link after the lever has performed its operation of transferring the link to the bracket at the end of the clamping operation; to provide the clamping means, preferably the bracket member and the lever, with cooperating members, such as enlargements or bosses upon the bracket member and resilient spring extensions or wings on the lever so that the wings will be caused to forcibly move over with frictional engagement over the bosses and ultimately take a place behind the bosses so that the lever cannot move into disengaging position of its own accord, yet permitting a forcible manual movement of the lever when it is desired to disengage the clamping means; and to provide such other and further objects, advantages and capabilities as will later more fully appear and are inherently possessed by the invention.

Figure 2:
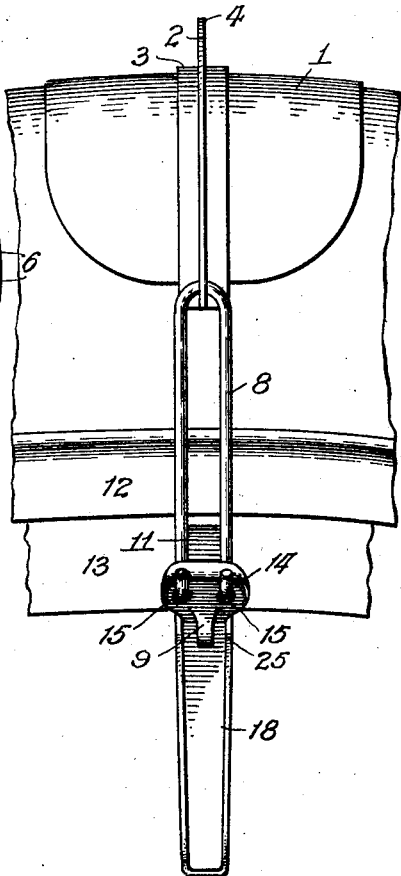
Figure 3:
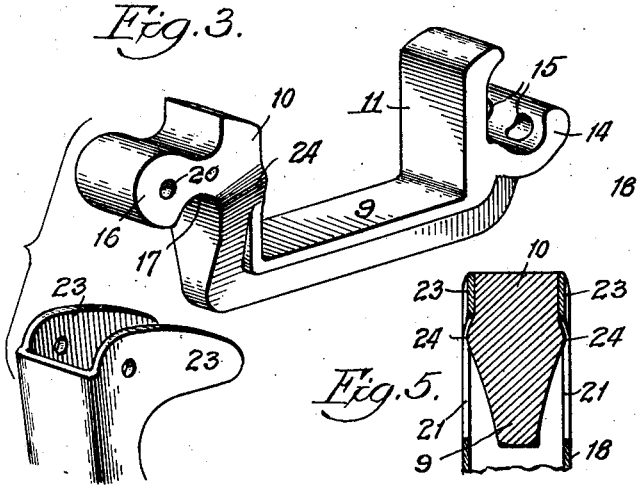
Figure 4:
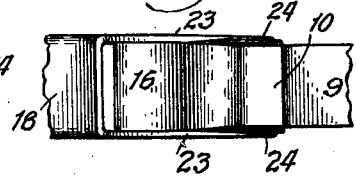
Figure 5:
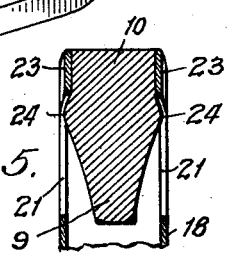

In the drawings illustrating a preferred form of the invention, Fig. 1 is a transverse sectional view of a tire and wheel showing the clamping mechanism in clamped position; Fig. 2 is a side view of the same and of a fragment of the tire and wheel; Fig. 3 is a detailed view in disassembled perspective of the bracket and a part of the clamping lever; Fig. 4 is a fragmentary plan view of an end of the bracket and the cooperating end of the lever, showing the parts in clamped position; and, Fig. 5 is a section taken on line 5—5 of Fig. 1.

Referring more particularly to the drawings, which show a preferred form or embodiment of the invention, there is shown a shoe comprising a tire support or sole 1 to which is rigidly fixed or fastened a cleat 2 having a base flange 3 suitably secured to the sole 1, as by riveting, brazing, welding or otherwise, and a radially extending flange or traction member 4. Both the sole 1 and the cleat 2 are concaved so as to fit transversely over the curved surface or periphery of the tire, such as a rubber tire of an automobile wheel.

At the opposite ends of the cleat member are provided a plurality of perforations or holes 5 and 6 into any one of either of which may be selectively connected, depending upon the size of the wheel, links 7 and 8, these links being preferably U-shaped and having their free ends extending inwardly toward the axis of the wheel for connection to a supporting member or bracket 9, preferably made of metal, such as malleable iron. The bracket is of substantially U-shape having a pair of legs 10 and 11 the ends of which are adapted to seat or bear against the inner periphery or surface of the metal rim 12 of the wheel. The bracket is also designed so that the legs, as well as the cross member of the bracket will be spaced from the wooden felly 13 of the wheel so that the latter may not be dented or otherwise damaged by reason of any pressure which might be placed upon it for the use of the ordinary type of clamp bracket, and also in order that the reaction stresses, at the time of clamping the device in place, will be taken up by the metal rim of the wheel without there occurring any give as would be present if the bracket were to bear against the felly 13.

At one end of the bracket 9 is formed or provided an ear 14 having a pair of perforations or holes 15 for receiving the hooked ends 16 of the link 8, as clearly shown in Figs. 1 and 2 of the drawing. At the other end of the bracket is provided a projection or ear 16 and a concaved portion 17 to form a shoulder upon which may be supported the free end of the link 7 as will be more clearly described hereinafter. To the ear 16 is pivotally connected a suitable lever 18, which is preferably of sheet metal bent and shaped to suitable form, the lever being pivotally connected to the ear 16 by means of a pivot pin 19 fitting in a perforation 20 formed in the ear 16. The side portions of the lever 18 are preferably provided with cam portions or surfaces 21 against which the free end 22 of the link 7 is adapted to operate when the device is being operated. The sides of the lever also extend laterally beyond the pivot 19 to form a pair of resilient or spring wings 23 capable of engaging with and riding over enlargements or bosses 24 formed on the side of the legs 10 of the bridge or bracket member 9. At the rear end of the cams 21, the lever is provided with guards 25 against which the end 22 of the link 7 may contact and which also aids in holding the link in position upon the cams when it is desired to clamp the device in place.

The parts of the clamp may be stored in a tool box on the automobile or any other desired place, and when ready to be used, the link 8 may be passed through one of the perforations 6, depending upon the size of tire upon which the clamp is to be used, and then the bracket member connected to the link 8 by passing the hooked ends 16 through the perforations 15. The operator may then, such as standing on a run-board of the automobile, place the shoe 1 upon the tire of the wheel, and with the link 8, bracket 9 and lever 18, in depending position, he may then move the lever, together with the bracket 9 and link 8, into the space between a pair of spokes and insert the handle end of the lever through the link 7, until the cams 21 come in contact with the end 22 of the link 7. In this position the brackets will be straddling the felly to be brought into bearing contact with the inner surface of the rim 12. The lever may then be operated by the hand, the cam's edges 21 acting at first to quickly draw or pull upon the link 7 for taking up looseness or slack in the mechanism or device, in general. This quickly brings the legs 10 and 11 into contact with the rim 12. Further movement of the lever will cause the end 22 of the link to ride over that portion of the cam which will now apply greater force to tightly clamp the device in place, the lever at the end of its movement, depositing or placing the end 22 of the link upon the shoulder 17 of the bracket, the wings 23 in the meanwhile being flexibly forced over the bosses 24 and dropping into the space behind the bosses as clearly shown in Figs. 1 and 5 of the drawing. In this position the link 7 is pulling against the shoulder 17 and there is no stress upon the lever 18 whatever. In this way there is no tendency to cause the lever to be thrown out of clamping position. The resistance offered by the bosses 24 against the wings 23 will also prevent the lever 18 from being thrown out of clamping position of its own accord.

With the device in position upon the wheel, and any number of devices may be attached to the wheel as desired, the cleat 2 will offer a sufficient tractive resistance against the ground, particularly soft earth or mud, so as to be able to propel the vehicle forward and be relieved of its stalled condition in a mud-hole or similar place.

The clamp may be detached as conveniently as it was attached by the use of one hand and with the operator standing, if desired, upon any part of the automobile, such as the run-board. This may be effected by merely pulling the lever 18 away from the clamp so as to cause the end of the cam portion 21 joining with the wings 23 to lift the end 22 of the link 7 away from the shoulder 17 and carrying it free thereof and into the curved portion of the cams toward the guards 25. The lever may then be lifted so that the links 7 may swing free of the lever, and the bracket 9 together with the lever 18 swung upon the hooks 16 and out of the space between the spokes of the wheel so that the clamping mechanism, as a whole, may be lifted from the tire and stored in the tool box or other suitable place.

While I have herein described and shown upon the drawings a preferred embodiment of the invention, it is to be understood that the invention is not limited to the particular construction, details and arrangement of parts shown and described, but that other constructions, details and arrangements of parts are comprehended by the invention without departing from the spirit thereof.

Having now described my invention, I claim:

1. A traction device comprising a member adapted to be clamped to the tire of a wheel and clamping means for detachably holding the member in place, said clamping means comprising a bracket on the wheel, said bracket provided with a lateral boss, a lever connected to the bracket and frictionally engaging the bracket and boss whereby the lever gives to manual force but remains fixed against self movement.

2. A traction device comprising a member adapted to be clamped to the tire of a wheel and clamping means for detachably holding the member in place, said clamping means comprising a bracket on the wheel, the bracket being formed with a lateral boss, a lever connected to the bracket and frictionally engaging the boss for holding the lever in ultimately moved position.

3. A traction device comprising a member adapted to be clamped to the tire of a wheel and clamping means for detachably holding the member in place, said clamping means comprising a bracket on the wheel, a lever pivoted to the bracket and having resilient wings, the bracket having bosses over which the wings flexibly move into position to hold the lever in locked position.

4. An anti-skid device including a felly engaging member adapted to support an anti-skid element on one end, a channel shaped locking member pivotally supported to said felly member adapted to engage the free end of said anti-skid element in a manner to extend the free end thereof over the center of the pivotal support of said channel member to lock said channel member with the sides of the same engaging against each side of a portion of said felly member.

5. An anti-skid device comprising a felly engaging member adapted to fit over the felly of a wheel, an eye formed on one end of said member, an arm issuing outwardly from the other end of said member, a tread member secured at one end to said eye and passing around the tire of the wheel, a locking member pivoted to said arm and adapted to engage the other end of said tread member for detachably securing the tread member to said engaging member and said locking member provided with prongs adapted to engage each side of said arm.

6. An anti-skid device comprising a felly engaging member adapted to fit over the felly of a wheel, an eye formed on one end of said member, an arm issuing outwardly from the other end of said member, a tread member secured at one end to said eye and passing around the tire of the wheel, a channel-shaped locking member pivoted to said arm and adapted to engage a portion of said member under spring tension of said channel member and a pair of prongs formed on said channel member adapted to lie approximately parallel with said arm when said locking member is in closed position.

In witness whereof, I hereunto subscribe my name to this specification.

SAMUEL G. SCHOLZ.